(12) United States Patent
Jung et al.

(10) Patent No.: US 11,851,066 B2
(45) Date of Patent: Dec. 26, 2023

(54) VEHICLE AND METHOD FOR CONTROLLING BODY THEREOF

(71) Applicants: HYUNDAI MOTOR COMPANY, Seoul (KR); KIA MOTORS CORPORATION, Seoul (KR)

(72) Inventors: Chan Hee Jung, Seoul (KR); Jin Su Jeong, Suwon-si (KR); Jae Yong Jeon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 319 days.

(21) Appl. No.: 17/121,178

(22) Filed: Dec. 14, 2020

(65) Prior Publication Data
US 2021/0188281 A1 Jun. 24, 2021

Related U.S. Application Data

(60) Provisional application No. 62/950,087, filed on Dec. 18, 2019.

(30) Foreign Application Priority Data

Oct. 23, 2020 (KR) ........................ 10-2020-0138203

(51) Int. Cl.
*B60W 40/02* (2006.01)
*B60W 60/00* (2020.01)
(Continued)

(52) U.S. Cl.
CPC ............... *B60W 40/02* (2013.01); *B60Q 1/04* (2013.01); *B60S 1/087* (2013.01); *B60S 1/0825* (2013.01);
(Continued)

(58) Field of Classification Search
None
See application file for complete search history.

(56) References Cited

U.S. PATENT DOCUMENTS 10,000,216 B2   6/2018   Cullinane et al.
10,241,510 B2   3/2019   Jung et al.
(Continued)

FOREIGN PATENT DOCUMENTS

DE   11 2016 006603 T5   2/2019
EP      3 190 025 A1     7/2017
(Continued)

OTHER PUBLICATIONS

European Search Report, EP 20 21 3047, dated May 11, 2021, 10 pages.

*Primary Examiner* — Peter D Nolan
*Assistant Examiner* — Jacob Kent Besteman-Street
(74) *Attorney, Agent, or Firm* — MORGAN, LEWIS & BOCKIUS LLP

(57) ABSTRACT

A vehicle and a method for controlling a body thereof are provided. The vehicle may include a processor, and non-transitory memory storing instructions executed by the processor. The processor may be configured to determine a first operation mode of a convenience device based on external environment information obtained by a sensor device when converting to an autonomous driving state; determine a second operation mode of the convenience device based on an input of a convenience device manipulator; compare the first operation mode with the second operation mode; and control the convenience device in the first operation mode or the second operation mode based on a comparison result.

16 Claims, 6 Drawing Sheets

(51) Int. Cl.
  *B60Q 1/04* (2006.01)
  *B60S 1/08* (2006.01)
  *B60W 10/30* (2006.01)

(52) U.S. Cl.
  CPC ........ *B60W 10/30* (2013.01); *B60W 60/0051* (2020.02); *B60W 60/0053* (2020.02); *B60W 2420/40* (2013.01); *B60W 2555/20* (2020.02)

(56) References Cited

U.S. PATENT DOCUMENTS

| | | |
|---|---|---|
| 2014/0156133 A1 | 6/2014 | Cullinane et al. |
| 2017/0235305 A1 | 8/2017 | Jung et al. |
| 2018/0079414 A1 | 3/2018 | Tellis et al. |
| 2019/0033860 A1 | 1/2019 | Okimoto et al. |
| 2019/0317494 A1 | 10/2019 | Lee et al. |
| 2020/0319636 A1* | 10/2020 | Urano ............... B60W 50/0097 |

FOREIGN PATENT DOCUMENTS

| | | |
|---|---|---|
| EP | 3 552 913 A2 | 10/2019 |
| WO | 2017/138681 A1 | 8/2017 |

\* cited by examiner

VEHICLE AND METHOD FOR CONTROLLING BODY THEREOF

CROSS-REFERENCE TO RELATED APPLICATION

This application claims priority to and the benefit of U.S. Provisional Patent Application No. 62/950,087, filed on Dec. 18, 2019 and Korean Patent Application No. 10-2020-0138203, filed on Oct. 23, 2020, the entire contents of which are incorporated herein by reference.

TECHNICAL FIELD

The present disclosure relates to a vehicle that controls an operation of a convenience device when converting an autonomous driving state, and a method for controlling a body thereof.

BACKGROUND

A body control module (BCM) is an electronic control unit (ECU) that monitors and controls various convenience devices (electronic accessories) in a body of a vehicle. In the vehicle, the BCM may control a lamp, a wiper, a power window, a seat, central lock, and/or a sunroof. In particular, when controlling the lamp and the wiper, the BCM controls operations of the lamp and the wiper based on an operation mode (e.g., a manual mode, an automatic mode, and the like) set by a driver.

SUMMARY

An aspect of the present disclosure provides a vehicle that controls an operation of a convenience device in consideration of an external environment of the vehicle and a manipulation input of the convenience device of a user when converting an autonomous driving state, and a method for controlling a body thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle includes a processor, and a memory for storing instructions executed by the processor, and the processor determines a first operation mode of a convenience device based on external environment information obtained by a sensor device when converting an autonomous driving state, determines a second operation mode of the convenience device based on an input of a convenience device manipulator, compares the first operation mode with the second operation mode, and controls an operation of the convenience device in the first operation mode or the second operation mode based on the comparison result.

In one implementation, the autonomous driving state conversion may include at least one of autonomous driving activation, autonomous driving control right transfer, or autonomous driving deactivation.

In one implementation, the sensor device may include at least one of an illuminance sensor or a rain sensor.

In one implementation, the convenience device manipulator may be implemented as a multi-function switch or input device generating data based on manipulation of a user.

In one implementation, the convenience device may be at least one of a head lamp or a wiper.

In one implementation, the processor may control the operation of the convenience device in the first operation mode when the first operation mode and the second operation mode are different in a state where an autonomous driving request is received, and control the operation of the convenience device in the second operation mode when the first operation mode and the second operation mode match each other.

In one implementation, the processor may compare a convenience device operation level based on the second operation mode with a convenience device operation level based on the external environment information to determine whether the convenience device in the second operation mode is suitable for an external environment, and set an operation mode of the convenience device to the first operation mode when it is determined that the convenience device in the second operation mode is not suitable for the external environment.

In one implementation, the processor may output a request to convert an operation mode of the convenience device when the first operation mode and the second operation mode are different in a state where an autonomous driving deactivation request is received.

In one implementation, the processor may determine whether there is a change in the input of the convenience device manipulator, and control the operation of the convenience device in the first operation mode when there is no change in the input.

In one implementation, the processor may immediately give up a control right of the convenience device and control the operation of the convenience device in the second operation mode when there is the change in the input.

According to another aspect of the present disclosure, a method for controlling a body of a vehicle includes determining a first operation mode of a convenience device based on external environment information obtained by a sensor device when converting an autonomous driving state, determining a second operation mode of the convenience device based on an input of a convenience device manipulator, comparing the first operation mode with the second operation mode, and controlling an operation of the convenience device in the first operation mode or the second operation mode based on the comparison result of the first operation mode and the second operation mode.

In one implementation, the autonomous driving state conversion may include at least one of autonomous driving activation, autonomous driving control right transfer, or autonomous driving deactivation.

In one implementation, the determining of the first operation mode may include determining the first operation mode based on an external environment recognized using at least one of an illuminance sensor or a rain sensor.

In one implementation, the determining of the second operation mode may include determining the second operation mode of the convenience device based on a location of a multi-function switch resulted from manipulation of a user.

In one implementation, the controlling of the operation of the convenience device may include controlling the operation of the convenience device in the first operation mode when the first operation mode and the second operation mode are different in a state where an autonomous driving request is received, and controlling the operation of the convenience device in the second operation mode when the first operation mode and the second operation mode match each other.

In one implementation, the controlling of the operation of the convenience device may further include comparing a convenience device operation level based on the second operation mode with a convenience device operation level based on the external environment information to determine whether the operation of the convenience device in the second operation mode is suitable for an external environment, and setting an operation mode of the convenience device to the first operation mode when it is determined that the operation of the convenience device in the second operation mode is suitable for the external environment.

In one implementation, the controlling of the operation of the convenience device may further include setting the operation mode of the convenience device to the second operation mode when it is possible to cope with the external environment.

In one implementation, the controlling of the operation of the convenience device may include outputting a request to convert an operation mode of the convenience device when the first operation mode and the second operation mode are different in a state where an autonomous driving deactivation request is received.

In one implementation, the controlling of the operation of the convenience device may further include determining whether there is a change in the input of the convenience device manipulator, and controlling the operation of the convenience device in the first operation mode when there is no change in the input.

In one implementation, the controlling of the operation of the convenience device may further include immediately giving up a control right of the convenience device and controlling the operation of the convenience device in the second operation mode when there is the change in the input.

DRAWINGS

The above and other objects, features and advantages of the present disclosure will be more apparent from the following detailed description taken in conjunction with the accompanying drawings.

DETAILED DESCRIPTION

Figure 1:
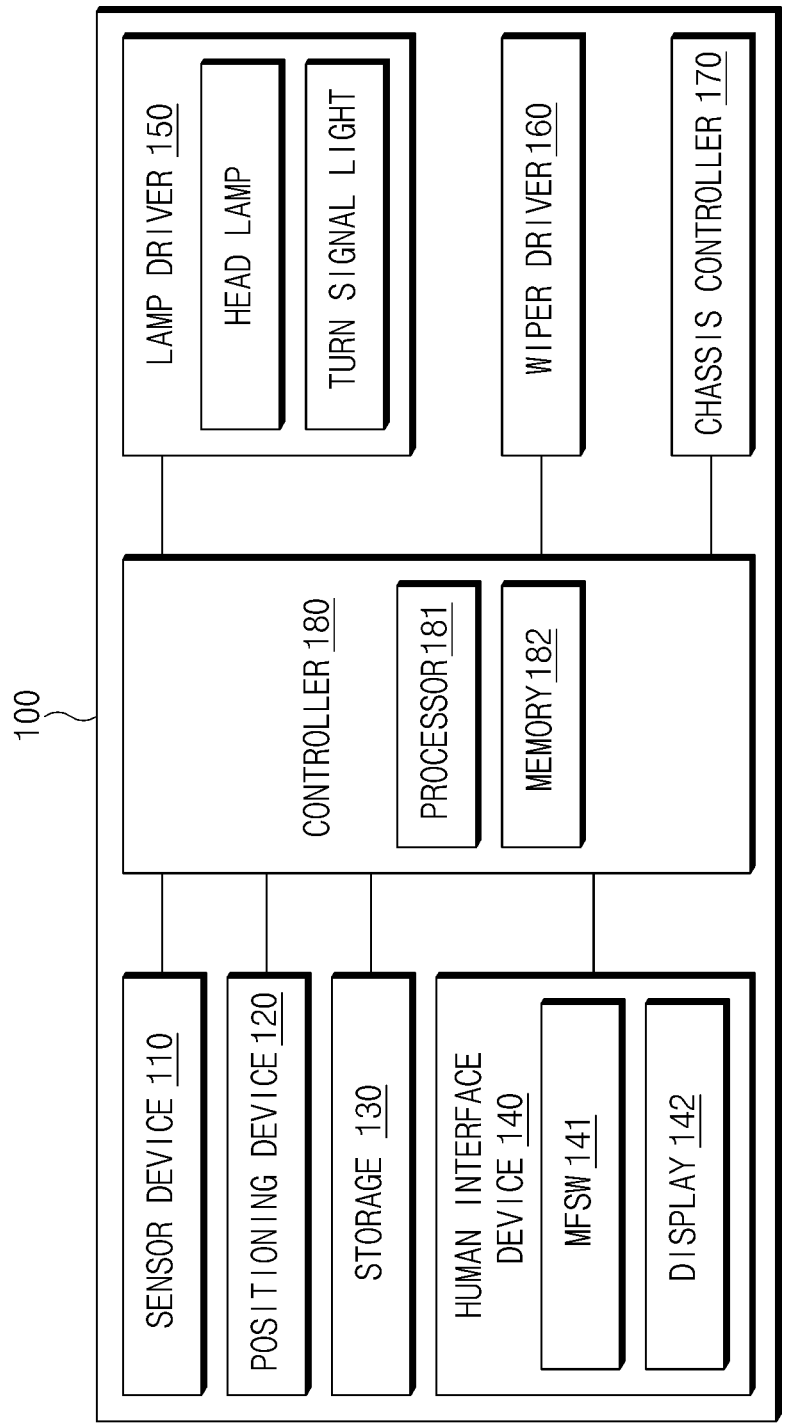
FIG. 1 shows a block diagram of a vehicle in one form of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
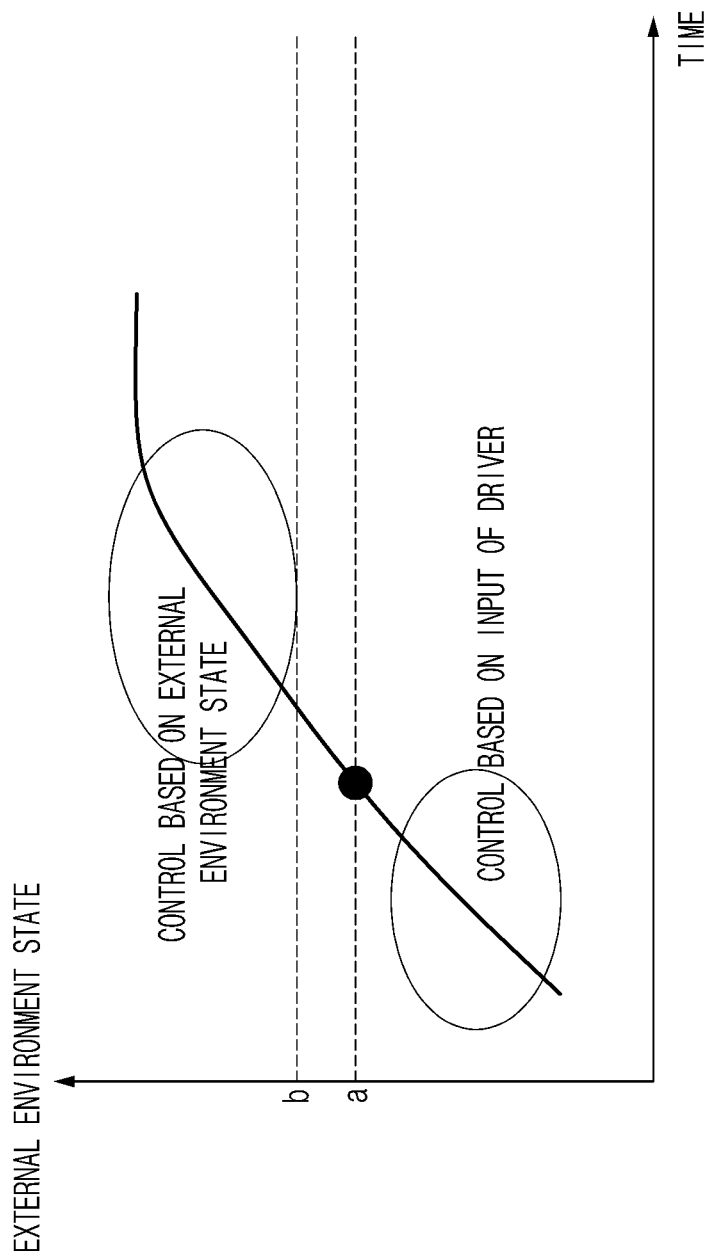
FIG. 2 is a diagram for illustrating convenience device control based on an external environment i one form of the present disclosure.

FIG. 1 shows a block diagram of a vehicle in some forms of the present disclosure. In addition, FIG. 2 is a diagram for illustrating convenience device control based on an external environment according to embodiments of the present disclosure.

Referring to FIG. 1, a vehicle 100 may include a sensor device 110, a positioning device 120, storage 130, a human interface device 140, a lamp driver 150, a wiper driver 160, a chassis controller 170, and a controller 180.

The sensor device 110 may detect (sense) exterior information and interior information of the vehicle. The exterior information may include illuminance and/or an amount of precipitation, and the interior information may include a vehicle speed and/or a steering angle. The sensor device 110 may include an illuminance sensor, a rain sensor, a radio detecting and ranging (RADAR), a light detection and ranging (LiDAR), an image sensor, an ultrasonic sensor, a shock sensor, a speed sensor, a wheel speed sensor, a steering angle sensor, and/or an acceleration sensor. The sensor device 110 may sense the illuminance outside the vehicle using the illuminance sensor and transmit the sensed illuminance information to the controller 180. In addition, the sensor device 110 may sense an amount and a speed of rainwater using the rain sensor located on a top outer face of a windshield glass and transmit the sensed precipitation information to the controller 180.

The positioning device 120 may measure a current location of the vehicle 100. The positioning device 120 may be implemented as a global positioning system (GPS) receiver. The GPS receiver may calculate the current location of the vehicle using signals transmitted from at least three GPS satellites. The GPS receiver may calculate a distance between the satellite and the GPS receiver using a time difference between a time when the signal is transmitted from the satellite and a time when the signal is received by the GPS receiver. The GPS receiver may calculate the current location of the vehicle using the calculated distance between the satellite and the GPS receiver and location information of the satellite contained in the transmitted signal. In this connection, the GPS receiver may calculate the current location using triangulation.

The storage 130 may store map data. The storage 130 may be implemented as at least one of storage media (recording media) such as a flash memory, a hard disk, a secure digital card (SD card), a removable disk, web storage, or the like.

The human interface device (HID) 140 may generate data based on manipulation of a user or output information such as visual information, auditory information, and/or tactile information. The human interface device 140 may include a multi-function switch (MFSW) 141 and a display 142.

The multi-function switch 141 is a convenience device manipulator for manipulating a convenience device such as a lamp and/or a wiper of the vehicle 100. The multi-function switch 141 may include a lamp operation switch and a wiper operation switch. The lamp operation switch may manipulate lamps such as a head lamp (a head light), a taillight, and/or a turn signal light. Based on a location of the lamp operation switch, the lamp operation switch may generate an operation stop signal, a taillight lighting signal, a headlight lighting signal, or an automatic lighting signal. The wiper operation switch may manipulate an operation and/or a speed of the wiper. Based on the location of the wiper operation switch, the wiper operation switch may generate an automatic operation signal, a wiper one-time operation (MIST) signal, an operation stop signal, an intermittent operation (INT) signal, a low speed operation signal, or a high speed operation signal.

The display 142 may output the visual information in response to an instruction of the controller 180. The display 142 may display a control state of an air conditioner, the wiper, and/or the lamp. In addition, the display 142 may display information requesting a driver to transfer a control right. The display 142 may include at least one of a liquid crystal display (LCD), a thin film transistor-liquid crystal display (TFT-LCD), an organic light-emitting diode (OLED) display, a flexible display, a 3-dimensional (3D) display, a transparent display, a head-up display (HUD), a touch screen, or a cluster. The display 142 may include a sound output module such as a speaker capable of outputting the auditory information (e.g., audio data and/or voice data), and/or a tactile signal output module capable of outputting the tactile information.

The lamp driver 150 may turn on, flicker, or turn off the lamp in response to the instruction of the controller 180. For example, the lamp driver 150 may operate or stop the head lamp and/or the turn signal light based on a lamp control signal transmitted from the controller 180. The lamp driver 150 may adjust a brightness and/or a direction (an angle) of the lamp (e.g., the head lamp) in response to the instruction of the controller 180.

The wiper driver 160 may operate or stop the wiper under control of the controller 180. The wiper driver 160 may adjust the operation speed of the wiper in response to the instruction of the controller 180. The wiper driver 160 may change an operation and an operation speed of a wiper motor based on a wiper operation signal transmitted from the controller 180 to transmit a rotational force to a wiper arm.

The chassis controller 170, which controls steering, braking, suspension, and/or driving of the vehicle 100 in response to the control of the controller 180, may include a driving device (a power transmission device), a steering device, a suspension device, a braking device, and the like. The driving device may generate power by controlling a power source (e.g., an engine or a motor) of the vehicle 100 and transmit the generated power to a wheel. The driving device may be implemented as an engine management system (EMS), a traction control system (TCS), and/or an all wheel drive system (AWD). The steering device may change a traveling direction of the vehicle 100 that is traveling. The steering device may be implemented as a four wheel steering system (4WS), an electric power steering (EPS), an active front steering (AFS), and/or a steer by wire (SBW). The suspension device may connect a vehicle body and an axle with each other to mitigate a vibration and a shock occurring on a road face and maintain a posture of the vehicle. The suspension device may be composed of a spring that relieves the shock transmitted from the road face, a damper that suppresses a free vibration, and a stabilizer bar that suppresses a roll motion to improve traveling stability of the vehicle. In addition, the suspension device may actively change a height of the vehicle body as well as a damping force of the damper and a rigidity of the stabilizer bar based on a traveling environment. The braking device may decelerate or stop the vehicle 100. The braking device may monitor a vehicle state in real time during the travel and control the braking based on the vehicle state. The braking device may include an anti-lock braking system (ABS), an electronic stability control (ESC), and/or an electronic parking brake (EPB) system.

The controller 180 is an electronic control unit (ECU) that controls autonomous driving and/or a body part of the vehicle 100. The controller 180 may exchange data (information and/or a signal) with each of components 110 to 170 through a vehicle network. The vehicle network may be implemented as a controller area network (CAN), a media oriented systems transport (MOST) network, a local interconnect network (LIN), an ethernet, and/or an X-by-Wire (a Flexray).

The controller 180 may include a processor 181 and a memory 182. The processor 181 controls an overall operation of the controller 180. The processor 181 may be implemented as at least one of an application specific integrated circuit (ASIC), a digital signal processor (DSP), a programmable logic device (PLD), a field programmable gate array (FPGA), a central processing unit (CPU), a microcontroller, and/or a microprocessor. The memory 182 may be a non-transitory storage medium that stores instructions executed by the processor 181. The memory 182 may store logic (algorithm) for performing a predetermined function and setting information. The memory 182 may be implemented as at least one of storage media (recording media) such as a flash memory, a hard disk, a secure digital card (SD card), a random access memory (RAM), a static random access memory (SRAM), a read only memory (ROM), a programmable read only memory (PROM), an electrically erasable and programmable ROM (EEPROM), an erasable and programmable ROM (EPROM), and/or a register. The memory 182 may store external environment recognition logic, travel state recognition logic, display control logic, lighting control logic, vehicle location recognition logic, collision determination prediction logic, vehicle travel control logic, body system control logic, and/or autonomous driving control logic. Each logic may be executed by the processor 181.

When autonomous driving state conversion is requested through the human interface device 140 or the autonomous driving control logic, the controller 180 may change the autonomous driving state in response to the request. In this connection, the autonomous driving state conversion may include at least one of autonomous driving activation, autonomous driving control right transfer, or autonomous driving deactivation.

The controller 180 may generate a head lamp lighting signal or a head lamp turn off signal in response to an input (e.g., the location information) of the lamp operation switch. In addition, the controller 180 may set an operation mode of the head lamp to an automatic mode based on the input of the lamp operation switch. When receiving the automatic lighting signal from the lamp operation switch, the controller 180 may set the operation mode of the head lamp to the automatic mode. When the operation mode of the head lamp is set to the automatic mode, the controller 180 may transmit a head lamp lighting command or a head lamp turn off command (the control signal) to the lamp driver 150 based on the illuminance measured by the illuminance sensor. When the operation mode of the head lamp is converted from the automatic mode to a manual mode (that is, when the head lamp automatic mode is deactivated), the controller 180 may set a lamp operation mode (the head lamp operation mode) based on the location of the lamp operation switch, and control the lamp driver 150 based on the set lamp operation mode to turn on or turn off the head lamp. The controller 180 may set the lamp operation mode to an operation stop mode, a taillight lighting mode, a head lamp lighting mode, or an automatic lighting mode based on the location of the lamp operation switch.

The controller 180 may generate a control signal for controlling the operation of the wiper based on an input of the wiper operation switch. The controller 180 may set an operation mode of the wiper to an automatic mode in response to an input of the wiper operation switch (e.g., an automatic operation signal). When the operation mode of the wiper is set to the automatic mode, the controller 180 may operate the wiper by controlling the wiper driver 160 based on the precipitation information (e.g., the amount of precipitation) detected by the rain sensor, and adjust the operation speed of the wiper. When the operation mode of the wiper is set to the manual mode, the controller 180 may control the wiper driver 160 based on the input of the wiper operation switch to control whether to operate the wiper and the operation speed of the wiper. In this connection, the manual mode may include a wiper one-time operation (MIST) mode, a wiper stop mode, an intermittent operation (INT) mode, a low speed operation mode, and a high speed operation mode. The controller 180 may set the wiper operation mode to the wiper one-time operation (MIST) mode, the wiper stop mode, the intermittent operation (INT) mode, the low speed operation mode, or the high speed operation mode based on the input of the wiper operation switch, and may transmit a command (a control signal) mapped to the set operation mode to the wiper driver 160.

The controller 180 may determine whether the user is holding a steering handle through the sensor device 110, and may perform automatic steering, automatic inter-vehicle distance control, and/or lane change functions based on the determination result. In addition, the controller 180 may warn the driver when a system critical situation occurs and perform a control right transfer function. The system critical situation refers to a situation of deviating from a region designed by a developer.

The controller 180 may set a driving mode of the vehicle 100 to a manual driving mode or an autonomous driving (automatic driving) mode based on a user input received from the human interface device 140. When receiving an autonomous driving request (e.g., a command to activate an autonomous driving function) from the human interface device 140, the controller 180 may convert the driving mode of the vehicle 100 from the manual driving mode to the autonomous driving mode. When converting the driving mode of vehicle 100 to the autonomous driving mode, the controller 180 may set an operation mode of the convenience device (e.g., the head lamp and/or the wiper) to an automatic mode regardless of external environment information of the vehicle 100. The controller 180 may recognize a surrounding vehicle and a surrounding environment of the vehicle 100 using the sensor device 110, and control the travel (the automatic driving) of the vehicle 100 based on the recognized information of the surrounding vehicle and the surrounding environment.

When receiving an autonomous driving deactivation command (a request to terminate the autonomous driving) during the autonomous driving, the controller 180 may convert the driving mode of the vehicle 100 from the autonomous driving mode to the manual driving mode. When the user does not transfer a convenience device control right for a predetermined time when converting to the manual driving mode, the controller 180 may transfer the convenience device control right to the user after stopping the vehicle 100.

For example, when the lamp operation mode is set to the manual mode when converting from the manual driving mode to the autonomous driving mode, the controller 180 may convert the lamp operation mode to the automatic mode (the automatic lighting mode). Further, when the wiper operation mode is the manual mode when converting from the manual driving mode to the autonomous driving mode, the controller 180 may convert the wiper operation mode and set the wiper operation mode to the automatic mode (the automatic operation mode). When converting from the autonomous driving mode to the manual driving mode, the controller 180 may request the user to transfer a control right of the lamp and the wiper, and convert the lamp operation mode and the wiper operation mode from the automatic mode to the manual mode upon user consent. When there is no user response to the transfer of the control for a predetermined time, the controller 180 converts the lamp operation mode and the wiper operation mode from the automatic mode to the manual mode after stopping the vehicle 100, so that the control right may be transferred to the user.

When receiving a signal requesting operation of the autonomous driving function, the controller 180 may detect the exterior information (external environment information) of the vehicle 100 using the sensor device 110, and detect location information of the multi-function switch 141 based on manipulation of the multi-function switch 141. The controller 180 may transmit an operation command for controlling the operation of the convenience device based on the external environment information and the location information of the multi-function switch 141. For example, when a rainy situation is sensed, the controller 180 may transmit a control command "high" for the wiper operation even when the wiper operation switch is located at an operation stop location.

The controller 180 may determine an operation mode (hereinafter, referred to as a first operation mode) of the convenience device based on the external environment information obtained by the sensor device 110. The controller 180 may determine an operation mode (hereinafter, referred to as a second operation mode) of the convenience device based on the input of the multi-function switch 141. The controller 180 may compare the first operation mode and the second operation mode with each other, and control the operation of the convenience device in the first operation mode or the second operation mode based on the comparison result. When the first operation mode and the second operation mode are different, the controller 180 may control the operation of the convenience device in the first operation mode. When it is impossible to cope with the external environment of the vehicle 100 by controlling the operation of the convenience device in the second operation mode, the controller 180 may set the operation mode of the convenience device to the first operation mode. When it is possible to cope with the external environment of the vehicle 100 by controlling the operation of the convenience device in the second operation mode, the controller 180 may set the operation mode of the convenience device to the second operation mode.

When the first operation mode and the second operation mode match, the controller 180 may control the operation of the convenience device in the second operation mode. In other words, when the first operation mode and the second operation mode match, the controller 180 may control the operation of the convenience device based on the location information of the multi-function switch 141. For example, when the first operation mode is the wiper low speed operation mode, and the second operation mode is the wiper low speed operation mode, the controller 180 may operate the wiper at a low speed by controlling the wiper driver 160 based on the input of the wiper operation switch.

When the first operation mode and the second operation mode are different in a state in which a request to deactivate the autonomous driving is received, the controller 180 may output a request to transfer the control right of the convenience device (a request to convert the operation mode). The controller 180 may determine whether there is a change in the input of the multi-function switch 141 after requesting the control right transfer, and may control the operation of the convenience device in the first operation mode when there is no change in the input. When there is no change in the input, the controller 180 may control the convenience device in the operation mode determined by the controller 180. When there is the change in the input, the controller 180 may immediately give up the control right of the convenience device and control the operation of the convenience device in the second operation mode. When there is the change in the input, the controller 180 may control the convenience device based on the input of the multi-function switch 141.

Referring to FIG. 2, when a current external environment state recognized by the sensor device 110 is below an external environment state "a" mapped to the input of the multi-function switch 141 of the driver, the controller 180 may transmit a control command mapped to the input of the multi-function switch 141 of the driver to the lamp driver 150 and/or the wiper driver 160. When the current external environment state is equal to or above external environment state +α mapped to the input of the multi-function switch 141, that is, when the current external environment state is equal to or above "b", the controller 180 may transmit a control command based on the current external environment state to the lamp driver 150 and/or the wiper driver 160.

When the current external environment state is equal to or above "b" when deactivating the autonomous driving, the controller 180 may maintain the operation mode of the convenience device as a control mode (the automatic mode) based on the current external environment state. In addition, the controller 180 may output the request to transfer the control right of the convenience device on the display 142. When the current external environment state is below the external environment state "a" mapped to the input of the multi-function switch 141 of the driver, the controller 180 may deactivate the autonomous driving mode and at the same time deactivate the automatic mode of the convenience device.

According to the above embodiment, although a form of the controller 180 in which an autonomous driving controller and a body controller are integrated is disclosed, the present disclosure may not be limited thereto, and the autonomous driving controller and the body controller may be implemented as separate control devices.

Figure 3:
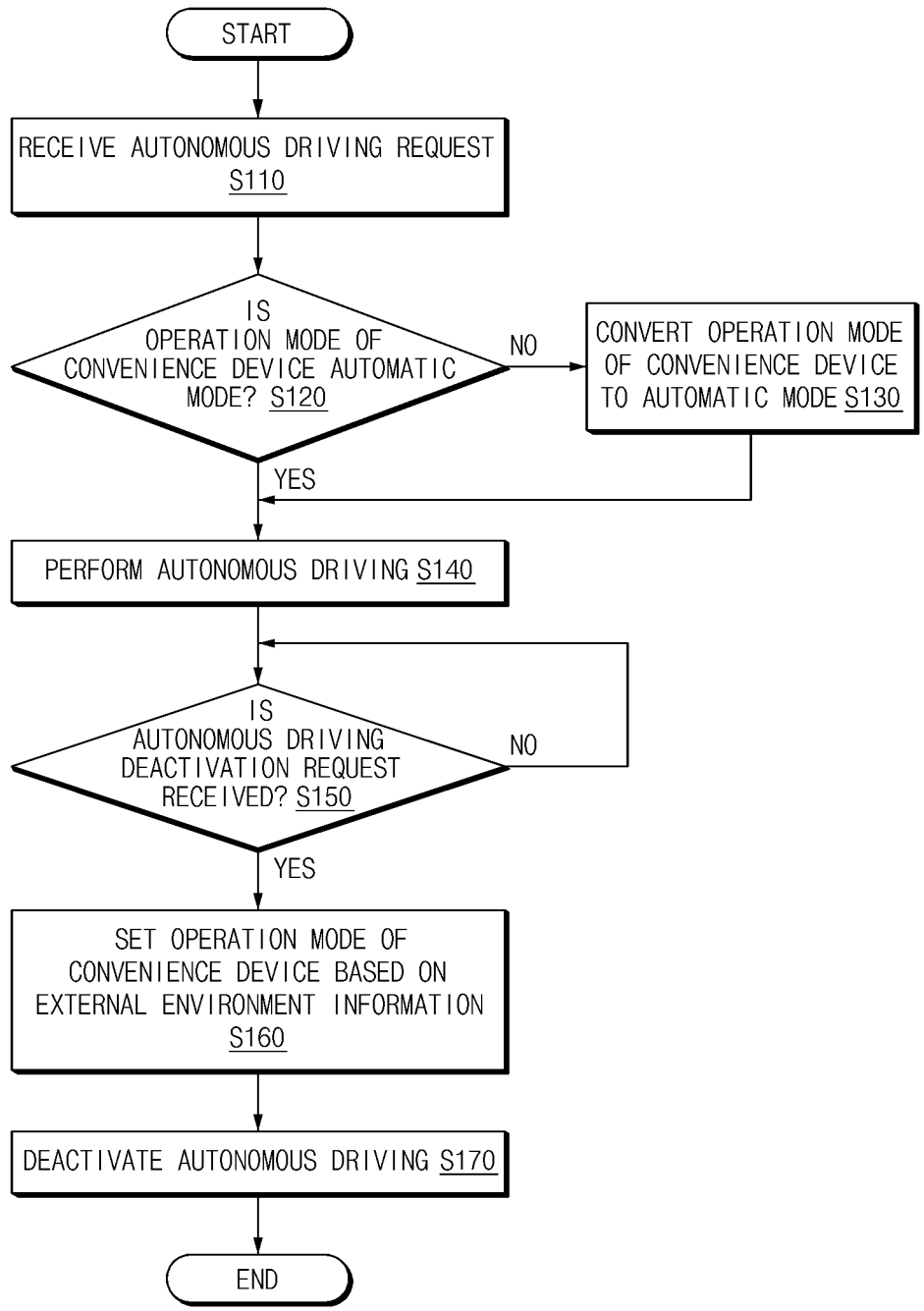
FIG. 3 is a flowchart illustrating a method for controlling a vehicle body in one form of the present disclosure.

FIG. 3 is a flowchart illustrating a method for controlling a vehicle body in some forms of the present disclosure.

The controller 180 may receive the autonomous driving request while the vehicle 100 is operating in the manual driving mode (S110). The controller 180 may receive an autonomous driving request signal from the human interface device 140 in response to the manipulation of the user (e.g., the driver).

When the autonomous driving request is received, the controller 180 may determine whether the operation mode of the convenience device is the automatic mode based on the location information of the convenience device manipulator (S120). When there is the autonomous driving request, the controller 180 may determine whether the operation mode of the head lamp is the automatic mode based on the location information of the lamp operation switch. Further, the controller 180 may determine whether the wiper operation mode is the automatic mode based on location information of the wiper operation switch.

When the operation mode of the convenience device is not the automatic mode, the controller 180 may convert the operation mode of the convenience device to the automatic mode (S130). When the operation mode of the convenience device is the manual mode, the controller 180 may convert the operation mode of the convenience device from the manual mode to the automatic mode.

When it is identified in S120 that the operation mode of the convenience device is the automatic mode, the controller 180 may perform the autonomous driving (S140). The controller 180 may obtain the exterior information and the interior information of the vehicle through the sensor device 110, and control the chassis controller 170 based on the obtained exterior information and interior information, thereby performing the autonomous driving. The controller 180 may obtain the vehicle exterior illuminance and/or the precipitation information through the illuminance sensor and/or the rain sensor during the autonomous driving, and control the lamp driver 150 and/or the wiper driver 160 based on the illuminance and/or the precipitation information, thereby lighting the head lamp or operating the wiper.

The controller 180 may receive the autonomous driving deactivation request during the autonomous driving (S150). The controller 180 may receive an autonomous driving deactivation request signal output from the human interface device 140 in response to the user input while the vehicle 100 is operating in the autonomous driving mode.

When the autonomous driving deactivation request is received, the controller 180 may set the operation mode of the convenience device based on the external environment information (S160). The controller 180 may maintain a current operation mode of the convenience device based on the external environment information or restore an operation mode prior to the autonomous driving.

When the setting of the operation mode of the convenience device is completed, the controller 180 may deactivate the autonomous driving (S170). The controller 180 may terminate the autonomous driving and convert the driving mode of the vehicle 100 from the autonomous driving mode to the manual driving mode.

Figure 4:
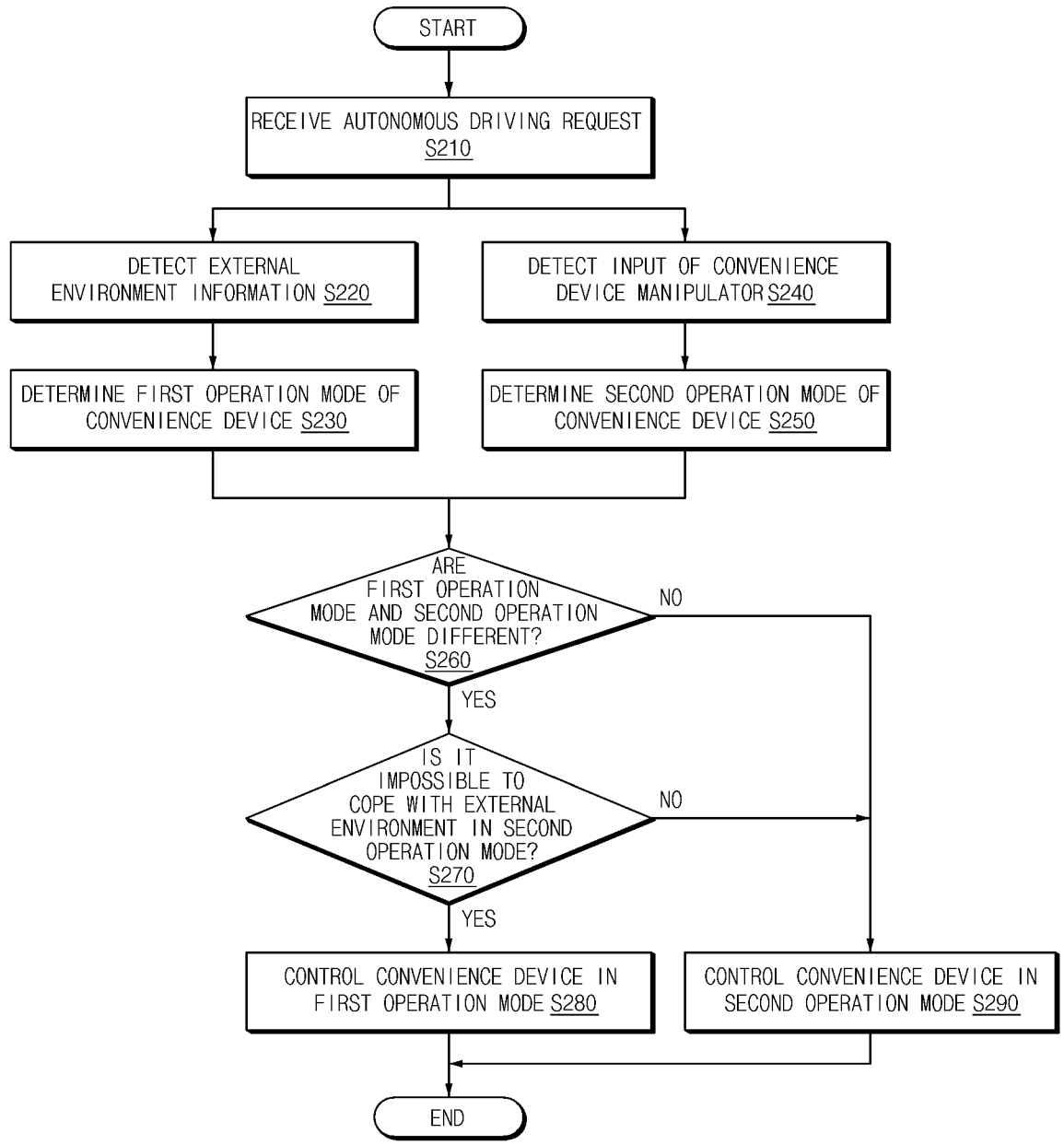
FIG. 4 is a flowchart illustrating a method for controlling a vehicle body when initiating autonomous driving in one form of the present disclosure.

FIG. 4 is a flowchart illustrating a method for controlling a vehicle body when initiating autonomous driving in some forms of the present disclosure.

The controller 180 may receive the autonomous driving request during the manual driving (S210). The controller 180 may receive the autonomous driving request signal from the human interface device 140 while the vehicle 100 is operating in the manual driving mode.

The controller 180 may detect the external environment information using the sensor device 110 (S220). The controller 180 may obtain the vehicle exterior illuminance and/or the precipitation information using at least one of the illuminance sensor or the rain sensor.

The controller 180 may determine the first operation mode of the convenience device based on the external environment information (S230). The controller 180 may determine the operation mode (that is, the first operation mode) of the convenience device based on the illuminance information and/or the precipitation information.

The controller 180 may detect the input of the convenience device manipulator (S240) while performing S220 and S230. The controller 180 may obtain the location information of the lamp operation switch and the location information of the wiper operation switch in the multi-function switch 141.

The controller 180 may determine the second operation mode of the convenience device based on the input of the convenience device manipulator (S250). The controller 180 may determine the operation mode (the second operation mode) of the head lamp based to the manipulation (the input) of the lamp operation switch, and determine the operation mode (the second operation mode) of the wiper based on the manipulation of the wiper operation switch.

The controller 180 may determine whether the first operation mode and the second operation mode are different (S260). The controller 180 may compare the operation mode determined by the controller 180 with an operation mode determined by the user.

When the first operation mode and the second operation mode are different, the controller 180 may determine whether it is impossible to cope with the external environment in the second operation mode (S270). The controller 180 may determine whether the operation mode of the convenience device input by the user may cover the current external environment state. The controller 180 may compare a convenience device operation level based on the second operation mode and a convenience device operation level based on the external environment information. When the convenience device operation level (e.g., a wiper low speed) based on the second operation mode is less than the convenience device operation level (e.g., a wiper high speed) based on the external environment information, the controller 180 may determine that it is impossible to cope with the external environment by controlling the operation of the convenience device in the second operation mode.

When it is impossible to cope with the external environment in the second operation mode, the controller 180 may control the convenience device in the first operation mode (S280). For example, when the operation mode of the wiper determined based on the current external environment information is the high speed operation mode, and when the operation mode of the wiper input by the user is the low speed operation mode, the controller 180 may determine the operation mode of the wiper as the high speed operation mode and instruct the wiper driver 160 to perform a high speed operation of the wiper.

When the first operation mode and the second operation mode are identical in S260 or the external environment is able to be coped in the second operation mode in S270, the controller 180 may control the convenience device in the second operation mode (S290). For example, when the operation mode of the wiper determined based on the current external environment information is the low speed operation mode, and when the operation mode of the wiper input by the user is the high speed operation mode, the controller 180 may determine the wiper operation mode as the high speed operation mode determined by the user input, and may instruct the wiper driver 160 to perform the high speed operation of the wiper.

Figure 5:
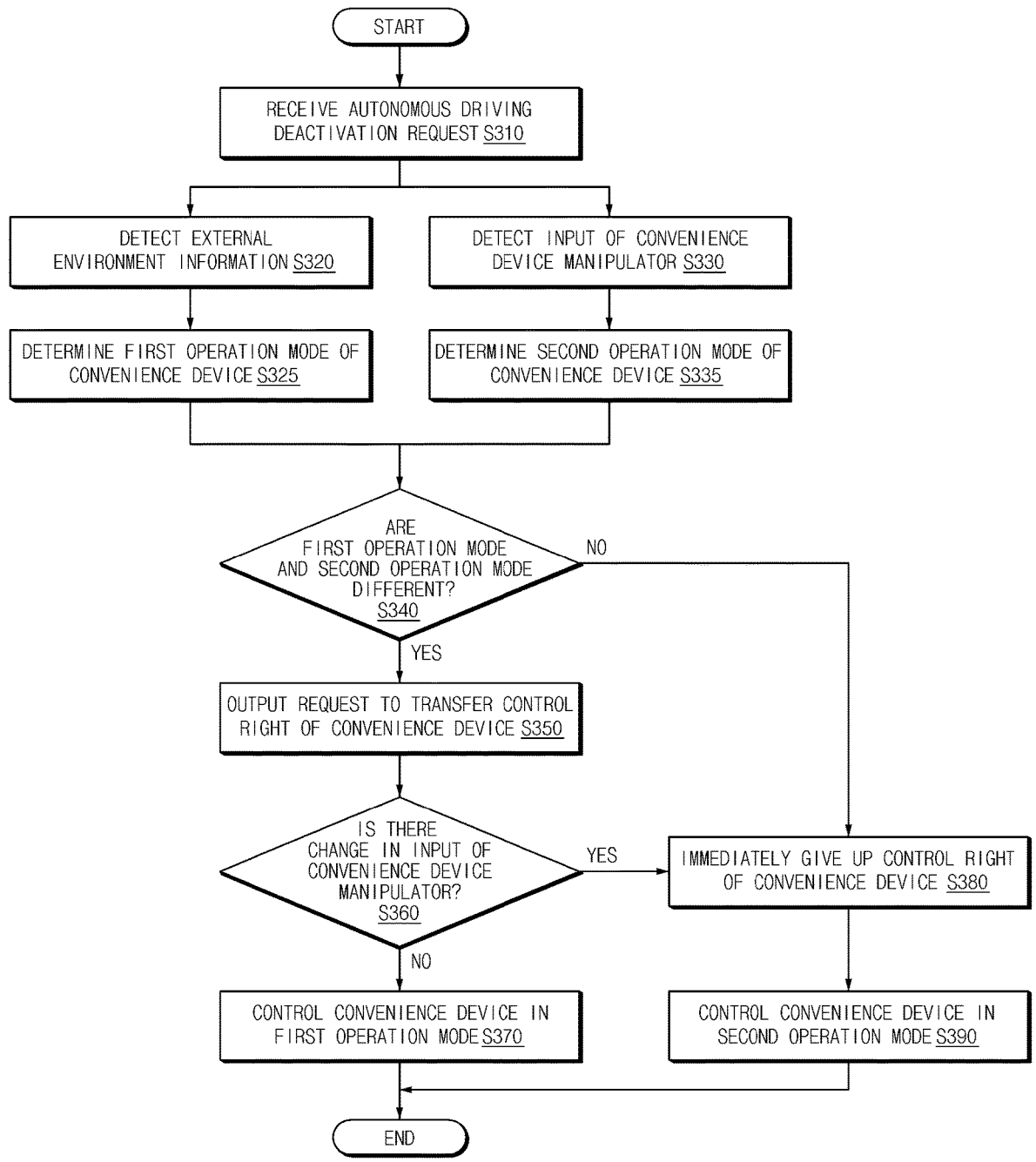
FIG. 5 is a flowchart illustrating a method for controlling a vehicle body when deactivating autonomous driving in one form of the present disclosure.

FIG. 5 is a flowchart illustrating a method for controlling a vehicle body when deactivating autonomous driving in some forms of the present disclosure.

The controller 180 may receive the autonomous driving deactivation request during the autonomous driving (S310). The controller 180 may receive the autonomous driving deactivation request signal from the human interface device 140 during the autonomous driving.

The controller 180 may detect the external environment information using the sensor device 110 (S320). The controller 180 may obtain the vehicle exterior illuminance information and/or the precipitation information through the illuminance sensor and/or the rain sensor.

The controller 180 may determine the first operation mode of the convenience device based on the external environment information (S325). The controller 180 may determine the operation mode (that is, the first operation mode) of the convenience device based on the illuminance information and/or the precipitation information.

The controller 180 may detect the input of the convenience device manipulator (S330). The controller 180 may detect the location information of the multi-function switch 141 based on the user manipulation. In other words, the controller 180 may obtain the location information of the lamp operation switch and the location information of the wiper operation switch.

The controller 180 may determine the second operation mode of the convenience device based on the input of the convenience device manipulator (S335). The controller 180 may determine the operation mode (the second operation mode) of the head lamp based on the input of the lamp operation switch, and may determine the operation mode (the second operation mode) of the wiper based on the input of the wiper operation switch.

The controller 180 may determine whether the first operation mode and the second operation mode are different (S340). The controller 180 may compare the operation mode determined by the controller 180 with the operation mode determined by the user.

When the first operation mode and the second operation mode are different, the controller 180 may output the request to transfer the control right of the convenience device (S350). When the operation mode determined by the controller 180 and the operation mode determined by the user are different, the controller 180 may output a message requesting the transfer of the control right of the convenience device on the display 142.

The controller 180 may determine whether there is the change in the input of the convenience device manipulator after outputting the control right transfer request (S360). The controller 180 may sense the manipulation of the multi-function switch 141.

When there is no change in the input, the controller 180 may control the convenience device in the first operation mode (S370). When the manipulation of the multi-function switch 141 is not sensed for a predetermined time, the controller 180 may maintain the operation mode determined by the controller 180. That is, the controller 180 may suspend the transfer of the control right of the convenience device.

When the first operation mode and the second operation mode are identical in S340 or there is the change in the input in S360, the controller 180 may immediately give up the control right of the convenience device (S380). When the manipulation of the multi-function switch 141 is sensed, the controller 180 may immediately give up the control right of the convenience device and transfer the control right of the convenience device to the user.

When giving up the control right of the convenience device, the controller 180 may control the convenience device in the second operation mode (S390). The controller 180 may control the operation of the convenience device based on the input of the multi-function switch 141 based on the user manipulation.

Figure 6:
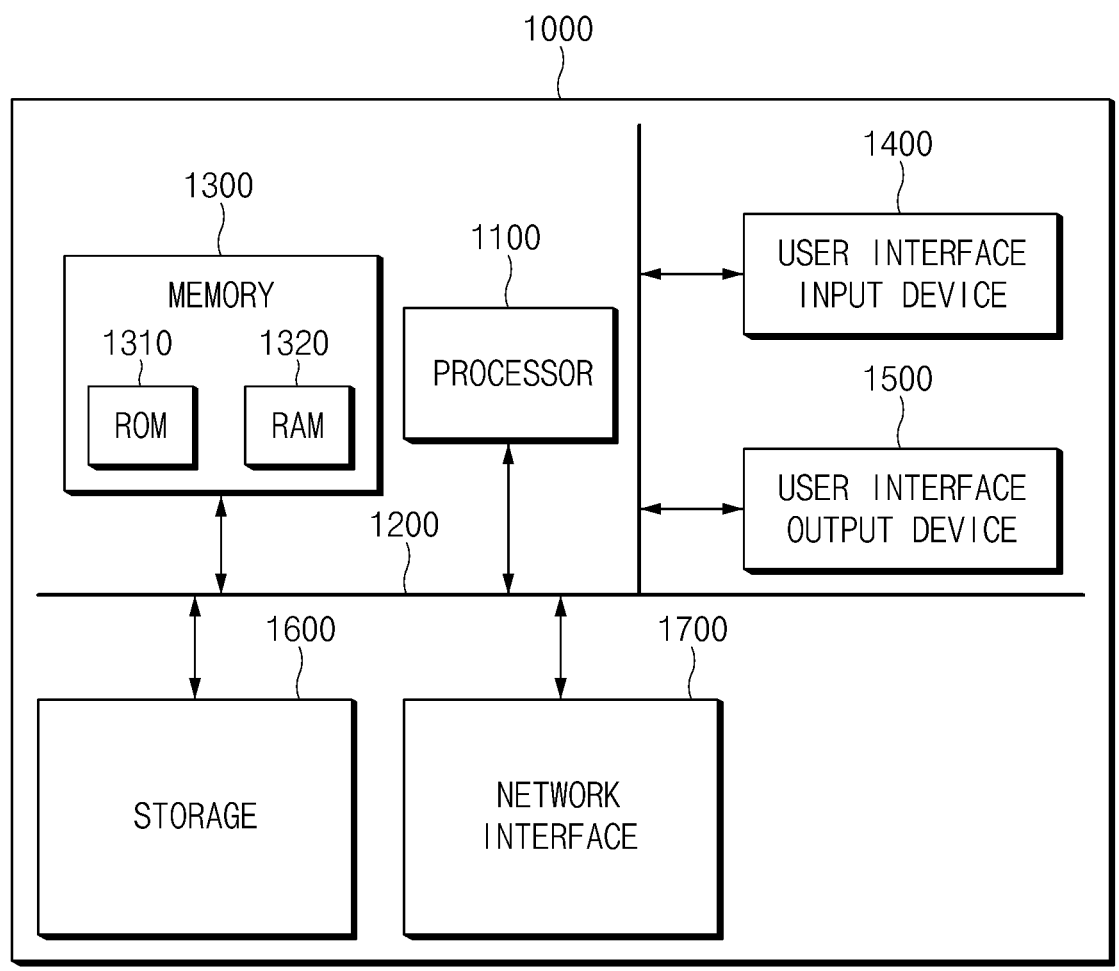
FIG. 6 is a block diagram illustrating a computing system executing a method for controlling a vehicle body in one form of the present disclosure.

FIG. 6 is a block diagram illustrating a computing system executing a method for controlling a vehicle body in some forms of the present disclosure.

With reference to FIG. 6, a computing system 1000 may include at least one processor 1100, a memory 1300, a user interface input device 1400, a user interface output device 1500, storage 1600, or a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor 1100 and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, because the operation mode of the convenience device is controlled in consideration of the external environment of the vehicle and the convenience device manipulation input of the user during the autonomous driving, a dangerous situation may be avoided and control convenience may be increased.

According to the present disclosure, when the autonomous driving is deactivated, the control right of the convenience device may be safely transferred to the driver in consideration of the external environment of the vehicle and the convenience device manipulation input of the user.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle comprising:
a processor; and
a non-transitory memory storing instructions executed by the processor,
wherein the processor is configured to:
determine a first operation mode of a device based on external environment information obtained by a sensor device when converting to an autonomous driving state;
determine a second operation mode of the device based on an input of a device manipulator;
compare the first operation mode with the second operation mode; and
control the device in the first operation mode or the second operation mode based on a comparison result, and
wherein the processor is configured to output a request to convert an operation mode of the device when the first operation mode does not match with the second operation mode in a state where an autonomous driving deactivation request is received.

2. The vehicle of claim 1, wherein the sensor device includes at least one of an illuminance sensor or a rain sensor.

3. The vehicle of claim 1, wherein the device manipulator is configured as a multi-function switch or an input device that is configured to generate data based on manipulation of a user.

4. The vehicle of claim 1, wherein the device is at least one of a head lamp or a wiper.

5. The vehicle of claim 1, wherein the processor is configured to:
control the device in the first operation mode when the first operation mode does not match with the second operation mode in a state where an autonomous driving request is received; and
control the device in the second operation mode when the first operation mode matches with the second operation mode.

6. The vehicle of claim 5, wherein the processor is configured to:
compare a device operation level based on the second operation mode with a device operation level based on the external environment information;
determine whether the device in the second operation mode is suitable for an external environment; and
set the operation mode of the device to the first operation mode when it is determined that the device in the second operation mode is not suitable for the external environment.

7. The vehicle of claim 1, wherein the processor is configured to:
determine whether there is a change in the input of the device manipulator; and
control the device in the first operation mode when it is determined that there is no change in the input.

8. The vehicle of claim 7, wherein the processor is configured to:
control the device in the second operation mode when it is determined that there is the change in the input.

9. A method for controlling a body of a vehicle, the method comprising:
determining a first operation mode of a device based on external environment information obtained by a sensor device when converting to an autonomous driving state;
determining a second operation mode of the device based on an input of a device manipulator;
comparing the first operation mode with the second operation mode; and
controlling the device in the first operation mode or the second operation mode based on a comparison result,
wherein controlling the device includes:
outputting a request to convert an operation mode of the device when the first operation mode does not match with the second operation mode in a state where an autonomous driving deactivation request is received.

10. The method of claim 9, wherein determining the first operation mode includes:
determining the first operation mode based on an external environment using at least one of an illuminance sensor or a rain sensor.

11. The method of claim 9, wherein determining the second operation mode includes:
determining the second operation mode based on a location of a multi-function switch manipulated by a user.

12. The method of claim 9, wherein controlling the device includes:
controlling the device in the first operation mode when the first operation mode does not match with the second operation mode in a state where an autonomous driving request is received; and
controlling the device in the second operation mode when the first operation mode matches with the second operation mode.

13. The method of claim 12, wherein controlling the device further includes:
comparing a device operation level based on the second operation mode with a device operation level based on the external environment information;
determining whether the device in the second operation mode is suitable for an external environment; and
setting an operation mode of the device to the first operation mode when it is determined that the device in the second operation mode is not suitable for the external environment.

14. The method of claim 13, wherein controlling the device further includes:
setting the operation mode of the device to the second operation mode when it is determined that the device in the second operation mode is suitable for the external environment.

15. The method of claim 9, wherein controlling the device further includes:
determining whether there is a change in the input of the device manipulator; and
controlling the device in the first operation mode when it is determined that there is no change in the input.

16. The method of claim 15, wherein controlling the device further includes:
controlling the device in the second operation mode when it is determined that there is the change in the input.

* * * * *